US008000844B2

(12) United States Patent
Mottura

(10) Patent No.: US 8,000,844 B2
(45) Date of Patent: Aug. 16, 2011

(54) FLIGHT CONTROL SYSTEM FOR AIRCRAFT AND TEST FOR TESTING SUCH A FLIGHT CONTROL SYSTEM

(75) Inventor: Alain Mottura, Fontenilles (FR)

(73) Assignee: Airbus France, Toulouse (FR)

( * ) Notice: Subject to any disclaimer, the term of this patent is extended or adjusted under 35 U.S.C. 154(b) by 1084 days.

(21) Appl. No.: 11/769,364

(22) Filed: Jun. 27, 2007

(65) Prior Publication Data

US 2008/0009983 A1    Jan. 10, 2008

(30) Foreign Application Priority Data

Jul. 4, 2006 (FR) ..................................... 06 06053

(51) Int. Cl.
*G01M 19/00* (2006.01)
(52) U.S. Cl. ............... 701/3; 455/66.1; 701/33; 701/35; 701/36; 340/945
(58) Field of Classification Search ................ 701/3, 33, 701/35, 36; 340/945; 455/66.1, 431, 98, 455/84
See application file for complete search history.

(56) References Cited

U.S. PATENT DOCUMENTS

| | | | |
|---|---|---|---|
| 4,454,588 A | | 6/1984 | O'Brien |
| 5,023,791 A * | | 6/1991 | Herzberg et al. ............... 701/35 |
| 5,111,402 A * | | 5/1992 | Brooks et al. .................. 701/35 |
| 5,260,874 A * | | 11/1993 | Berner et al. .................. 701/33 |
| 6,072,994 A * | | 6/2000 | Phillips et al. .................. 455/84 |
| 6,115,656 A * | | 9/2000 | Sudolsky .......................... 701/35 |
| 6,151,567 A * | | 11/2000 | Ames et al. ..................... 703/13 |
| 6,160,998 A * | | 12/2000 | Wright et al. ................. 455/66.1 |
| 6,163,681 A * | | 12/2000 | Wright et al. ................. 455/66.1 |
| 6,167,238 A * | | 12/2000 | Wright .......................... 455/66.1 |
| 6,353,734 B1 * | | 3/2002 | Wright et al. .................... 455/98 |
| 6,443,399 B1 * | | 9/2002 | Yount et al. ................... 244/196 |
| 6,487,914 B1 * | | 12/2002 | Hodge ............................ 73/800 |
| 6,539,337 B1 * | | 3/2003 | Provan et al. ................. 702/183 |
| 6,572,376 B1 * | | 6/2003 | Saunders ........................ 434/30 |
| 6,598,002 B1 * | | 7/2003 | Claverie .......................... 702/68 |
| 7,286,913 B2 * | | 10/2007 | Bodin et al. ..................... 701/11 |
| 7,319,396 B2 * | | 1/2008 | Homanfar et al. .......... 340/572.1 |
| 7,406,050 B2 * | | 7/2008 | Calluaud et al. .............. 370/250 |
| 7,428,210 B2 * | | 9/2008 | Saika ............................. 370/217 |
| 7,551,989 B2 * | | 6/2009 | Knotts et al. ...................... 701/3 |
| 7,620,374 B2 * | | 11/2009 | Ziarno et al. .................... 455/98 |
| 7,636,568 B2 * | | 12/2009 | Gould et al. ................... 455/431 |
| 7,679,306 B2 * | | 3/2010 | Jones ............................. 318/611 |
| 7,693,986 B2 * | | 4/2010 | Berbiguier et al. ........... 709/224 |
| 2004/0168104 A1 * | | 8/2004 | Whetsel .......................... 714/28 |
| 2006/0156137 A1 * | | 7/2006 | Raul et al. ...................... 714/738 |
| 2007/0243505 A1 * | | 10/2007 | Rath et al. ....................... 434/29 |
| 2008/0009983 A1 * | | 1/2008 | Mottura ............................ 701/3 |
| 2010/0287316 A1 * | | 11/2010 | Rittmueller ................... 710/106 |

OTHER PUBLICATIONS

Preliminary Search Report dated Apr. 5, 2007.

* cited by examiner

*Primary Examiner* — Thomas Black
*Assistant Examiner* — Wae Louie
(74) *Attorney, Agent, or Firm* — Dickinson Wright PLLC

(57) ABSTRACT

A test system for testing a flight control system of an aircraft includes a test device that: (1) accesses information available from the flight control system and (2) controls a computer of the flight control system.

17 Claims, 2 Drawing Sheets

FLIGHT CONTROL SYSTEM FOR AIRCRAFT AND TEST FOR TESTING SUCH A FLIGHT CONTROL SYSTEM

FIELD OF INVENTION

The present invention relates to a flight control system (comprising at least one flight control computer) for an aircraft, a transport aircraft in particular, as well as to a test system which is intended to test such a flight control system.

BACKGROUND OF THE RELATED ART

It is known that throughout the construction of an aircraft, tests must be carried out in order to check the correct functioning of equipments and systems installed on that aircraft. It is also known that, during the final assembly phase of a transport aircraft, it is particularly necessary to check the flight control system which generally and usually comprises a plurality of flight controls of the electrical type and/or hydraulic type. This latter check is part of the most time-consuming stages of the assembly line. This is because, in order to test the flight controls, it is necessary to activate an existing functional mode on each of the flight control computers in order to be able to test the conformity of the aircraft with respect to its definition dossier. In particular, in order to check the wiring (wire by wire) and to guarantee the integrity of the flight control system, the functional implementation of the flight control computers imposes, because of the complexity of said system, the use of tools for simulating the environment of the aircraft and the setting up of complex and exhaustive procedures.

The tools for simulating and configuring the aircraft used in this final assembly phase encounter significant reliability problems. In fact, experience has shown that about 80% of faults detected at present are related to these tools and not to the system itself.

Moreover, on a redundant system such as an electrical flight control system, as soon as a fault appears, the latter is made passive and the system is automatically reconfigured in order that another flight control computer or another component of said flight control system provides the defective function using another means. In such a situation, the fault is not therefore directly detectable. This operating mode consequently makes it very difficult to locate a fault.

Moreover, when the aircraft is in the test or operational phase, the simulation tools used in the construction phase are no longer available such that the location of anomalies or faults then becomes even more complex and longer to carry out. In this case, a location is generally carried out by means of measurements (continuity, insulation, etc.) carried out directly on the wiring of the aircraft and by exchanging components. Such location therefore makes it necessary to have the availability of persons providing the maintenance of very extensive means.

Consequently, the usual test procedures and systems, such as mentioned above, are not completely satisfactory. In particular, they are of high cost and necessitate a very long testing time.

SUMMARY OF THE INVENTION

The present invention relates to a flight control system for an aircraft, a transport aircraft in particular, which can be subjected to tests and which makes it possible to overcome the aforesaid disadvantages.

For this purpose, according to the invention, said flight control system for an aircraft, of the type comprising at least one flight control computer which comprises a first processing means able to implement a (usual) functional mode, is noteworthy in that it furthermore comprises:

a second processing means which is able to implement a test mode, in which the flight control computer can be subjected to commands received from the exterior (of said flight control system) and making it possible to take over said flight control computer;

switching means making it possible to carry out switching between said first and second processing means; and interface means making it possible:

in the functional mode, to transmit to the exterior (of said flight control system) information available in said flight control computer; and in the test mode, to transmit to the exterior (of said flight control system) information available in said flight control computer and to receive commands from the exterior.

In a preferred embodiment, said flight control system comprises a plurality of flight control computers and each of said flight control computers comprises first and second processing means and interface means such as those mentioned above.

The present invention also relates to a test system which makes it possible to overcome the aforesaid disadvantages.

According to the invention, said test system which is intended to test a flight control system (of the type comprising at least one flight control computer) comprises, in addition to said flight control system, a test device which comprises means of connection making it possible to connect, in a detachable manner, to said flight control computer and which is able to be put into one of the following two operational phases:

a data reception phase, in which it cooperates with said first processing means of the flight control computer which is then in functional mode in order to have access in real time to all of the information, including fault indications, which is available on said flight control computer; and a test phase, in which it cooperates with said second processing means of the flight control computer which is then in test mode in order to make it possible to take over said flight control computer and to have access to the information generated by such a taking over.

Thus, due to the invention, a particularly effective test system is obtained. In particular, as described below, this test system makes it possible:

to greatly reduce and simplify the tests carried out on a flight control system;

to provide a complete display of said flight control system in real time (in data reception mode);

to observe the faults associated with the flight control system in real time, and thus to be able to locate intermittent faults easily;

to be able to automate repetitive tasks simply;

to be able to intervene on the aircraft rapidly and simply; and to save time in all of the maintenance operations associated with the flight control system, in comparison with usual test systems.

Advantageously, said flight control system comprises a plurality of flight control computers and said test device is able to be connected, by means of said connection means, to all of these flight control computers and it is able to cooperate (individually or collectively) with the latter (and to do so in the data reception phase or in the test phase).

According to the invention, said test device furthermore comprises:
- at least one display means making it possible to present, on at least one display screen, information received from said flight control system, which can thus be viewed immediately by an operator; and/or
- at least one recording means making it possible to record, on at least one usual recording medium, information received from said flight control computer, which can in particular be used subsequently for carrying out tests.

In a particular embodiment, said test device is formed in such a way as to have access, in the data reception phase, to at least some of the following information:
- characteristics of the control surfaces of the aircraft;
- characteristics of the piloting devices of the aircraft;
- information relating to faults in the systems of the aircraft;
- the status of the computers of the aircraft; and
- the status of the hydraulic system of the aircraft.

This data reception phase provides the possibility of observing completely the behavior of the flight control system, in operational mode, without affecting its behavior (non-intrusive observation).

Moreover, advantageously, said test device is formed in such a way as to make it possible, in the test phase:
- to display in real time at least one input available on at least one flight control computer;
- to activate at least one output of at least one flight control computer; and
- to display faults in real time.

It will be noted that this test phase has the following purpose in particular:
- to respond both to the requirements of tests during the construction of the aircraft and to improve the location of breakdowns once the means set up for the construction are no longer available (aircraft under test or in use);
- to be able to use the flight control computers of the flight control system directly for testing the wiring, which makes it possible to do without the usual simulation tools; and
- to facilitate searching for anomalies by no longer using the functional software (used by said first processing means) of a flight control computer for testing the flight control system, but by using said second processing means which is specific and which is dedicated to searching for anomalies, as described below.

In a particular embodiment, said test device furthermore comprises a means making it possible to trace the evolution in real time of an item of information (for example a particular flight parameter) received from said flight control system, both in the data reception phase and in the test phase.

Moreover, said test system advantageously furthermore comprises a secure gateway, by the intermediary of which the test device can be linked with at least one usual communication bus of the aircraft, which generally interconnects at least the various flight control computers of the flight control system.

Moreover, in order to further increase safety, the test system advantageously comprises secure means in order to secure the activation of the test mode, for example by making necessary the connection of physical keys on the aircraft and/or the sending of a password to the associated flight control computer.

In a preferred embodiment, said test device represents a man/machine interface tool, preferably a portable personal computer, which comprises at least a display screen and at least a unit allowing an operator to enter data. Thus, said test device (and therefore said test system) has very great mobility, which allows its users to intervene very easily on the aircraft, and to do so wherever that aircraft is located.

In another particular embodiment, as a variant of said preferred embodiment, said test device corresponds to an automatic test station.

BRIEF DESCRIPTION OF THE DRAWINGS

The figures of the appended drawing will give a good understanding of how the invention can be embodied. In these figures, identical references indicate similar elements.

DETAILED DESCRIPITON OF THE INVENTION

Figure 1:
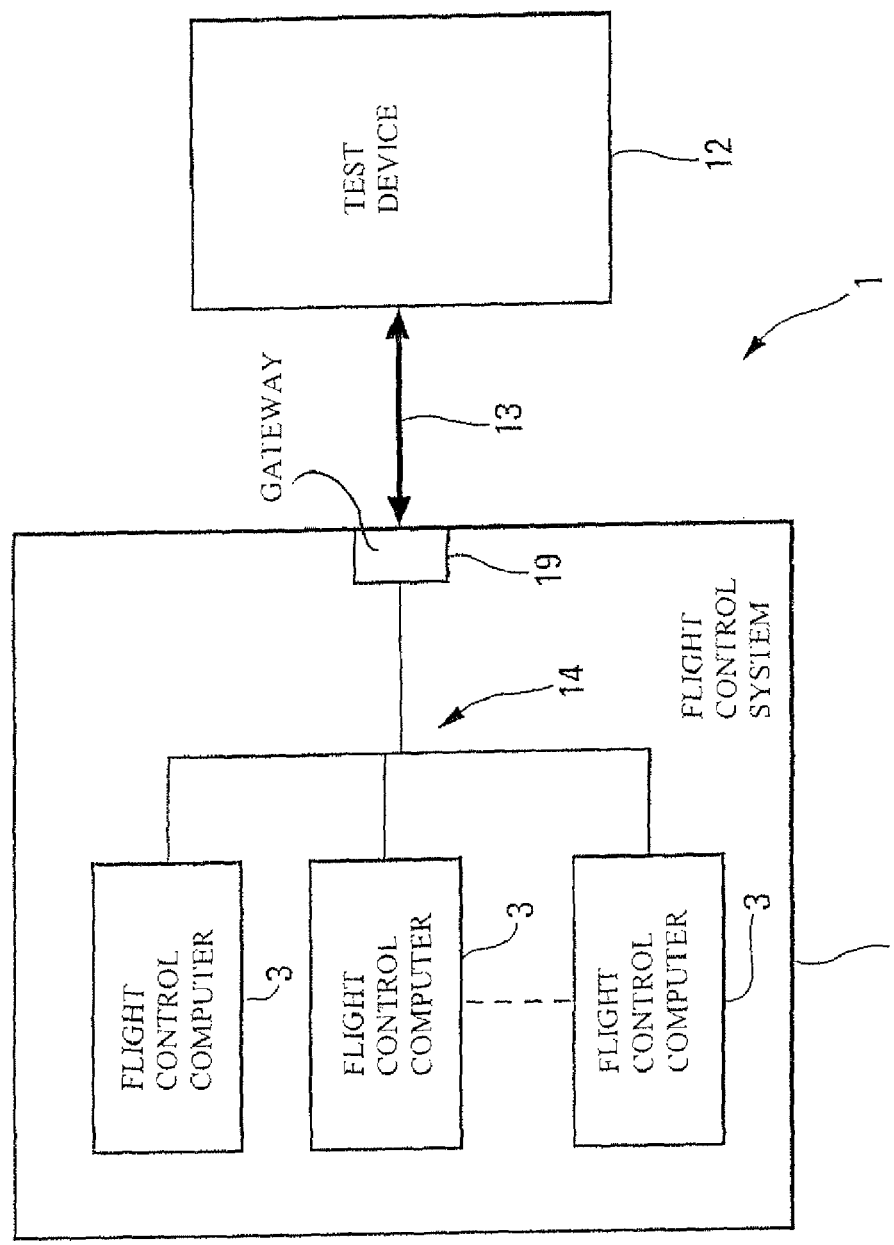
FIG. 1 is the block diagram of a test system according to the invention.

The test system 1 according to the invention and shown diagrammatically in FIG. 1 is intended to test a flight control system 2 of an aircraft, in particular of a transport aircraft, which is not shown. In the usual manner, such a flight control system 2 is intended for controlling control surfaces (rudder, elevator, etch) of the aircraft, in response to commands received through a piloting device (such as a rudder bar or a control stick) and/or by automatic means.

Figure 2:
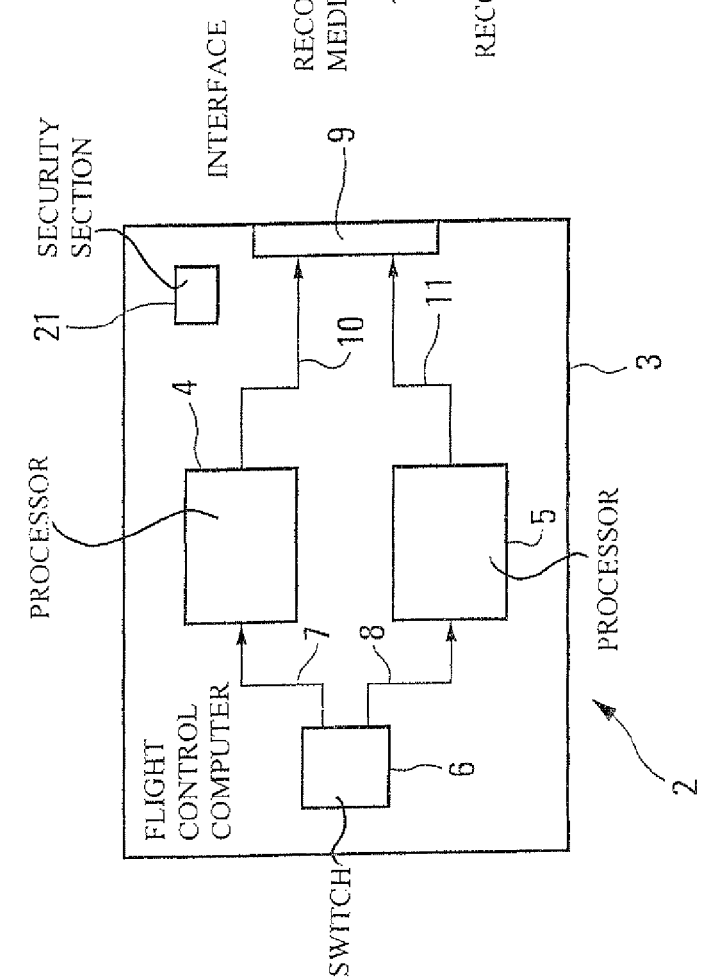
FIG. 2 is the block diagram of a flight control computer according to the invention.

It is known that a flight control system 2 generally comprises one or more flight control computers 3, such as the one shown in FIG. 2. Usually, such a flight control computer 3 comprises a processing means 4 which is able to implement a usual functional mode, that is to say a mode in which the computer 3 carries out its habitual functions. Such a processing means 4 is known and is not further described in the present description.

In order to make it possible to carry out tests on such a flight control system 2, said flight control computer 3 comprises, according to the invention, and in addition to said integrated processing means 4, the following integrated means:
- a processing means 5 which is able to implement a test mode described below, by which the flight control computer 3 can be subjected to commands which are received from outside of said computer 3 and which allow a taking over of said computer 3;
- switching means 6 which are connected by the intermediary of connections 7 and 8 respectively to said processing means 4 and 5 and which are formed in such a way as to carry out a switching between these processing means 4 and 5; and
- interface means 9 which are connected by the intermediary of connections 10 and 11 respectively to said processing means 4 and 5 and which are formed in such a way as to make it possible to:
  - in the functional mode, transmit to the exterior information available in said flight control computer 3; and
  - in the test mode, transmit to the exterior information available in said flight control computer 3 and to receive commands from the exterior.

In the context of the present invention, said flight control system 2 can comprise:
- either a single flight control computer 3, as shown in FIG. 2;

or a plurality of flight control computers 3, as shown in FIG. 1. In this case, each of said flight control computers 3 comprises processing means 4 and 5, switching means 6 and interface means 9, such as those previously described with reference to FIG. 2.

According to the invention, in order to be able to carry out tests of said flight control system 2, whatever the phase in question may be, that is to say in the construction phase, in the test phase or in the operational phase of the aircraft, said test system 1 according to the invention comprises, in addition to this flight control system 2, as shown in FIG. 1, a test device 12 which comprises connecting means 13 making it possible to connect, in a detachable manner, to said at least one flight control computer 3 of said system 2. This test device 12 is able to be put into one of the following two functional phases:

- a data reception phase, in which it cooperates with said processing means 4 of this computer 3 (which is then in functional mode) such that said test device 12 then has access in real time to all of the information, including fault indications, which is available on said flight control computer 3; and
- a test phase, in which it cooperates with said processing means 5 of this computer 3 (which is then in test mode) in order to allow the taking over of said flight control computer 3 and to have access to the information generated by such a taking over, which is described below.

In the context of the present invention, the expression "take over a flight control computer" means the possibility of sending commands to the latter (by the intermediary of the test device 12) and, more precisely, commands such as the simple activation of one or more outputs or more complex activations such as servo-controlling a control surface to assume a given position. In such a use, the piloting devices no longer have any effect on the system, they can solely be viewed like all of the inputs of the system.

When, as in FIG. 1, said flight control system 2 comprises a plurality of flight control computers 3, said test device 12 is able to be connected by the intermediary of said connection means 13 to all of these flight control computers 3. In order to do this, said connection means 13 are preferably linked to at least one usual communication bus 14 of the aircraft, which in particular makes it possible to interconnect all of the different flight control computers 3 in the form of a network, for example of the known AFDX type.

Said test device 12 takes part in different functional modes (functional mode and test mode) of the flight control computers 3 according to the invention of said flight control system 2 such that:

- when one or more computers 3 are in functional mode, said test device 12 allows a non-intrusive analysis in real time of the behavior of the system 2; and
- when one or more computers 3 are in test mode, said test device 12 benefits from all of the extensive control possibilities of the flight control system 2, like the reading of inputs, the activation of outputs and the taking over of the servo-controls of control surfaces, in particular viewing in real time all of the parameters as described below.

Said test device 12 is designed to search for anomalies and to reveal the behavior of the system 2 and any failure which affects it.

The test device 12 according to the invention therefore makes it possible to have real time access to the whole of the flight control system 2 from the time when at least one flight control computer 3 is present, and for this to be so no matter what its operational mode is (functional mode or test mode).

In the data reception mode, said test device 12 makes it possible to know the status of the system 2 and, in the case of failure, it makes it possible to efficiently prepare the search for the anomaly by providing a preliminary location of the faults detected by the computers 3, as well as direct access to plans associated with the system 2.

In a particular embodiment, said test device 12 is formed in such a way as to have access, in the data reception phase, to at least some of the following information:

- characteristics (position, command, computer engaged, energy used, etc.) relating to control surfaces of the aircraft;
- characteristics of piloting devices (control stick, rudder bar, etc.) of the aircraft;
- information relating to faults in the aircraft's systems;
- the status (on, off, failed) of the aircraft's computers; and
- the status of a hydraulic system of the aircraft.

This data reception phase provides the possibility of observing the behavior of the flight control system 2 completely, in functional mode, without having any effect on its behavior (non-intrusive observation).

Moreover, in the test phase, the test device 12 makes it possible to take over the computers 3 very easily and to carry out servo-controls on any control surface (which is controlled by at least one of these computers 3), whilst observing the parameters to be associated with the latter, and to do this even in the presence of failures, which is not possible in the usual functional mode.

It will be noted that a test mode according to the invention constitutes a functional mode entirely separate from the flight control computer 3 in question and, when a computer 3 is in this test mode, the usual functional mode is no longer executed.

More precisely, when they are in test mode, the flight control computers 3 cyclically send the status of all of the inputs to the test device 12 (output direction) which can therefore extract the interesting information and use it for a test or a display.

Moreover, in the input direction, the flight control computers 3 are able to process particular commands, received from said test device 12 and allowing, in particular:

- the activation of one or more outputs (independently from the logics of the system 2); and
- the processing of complex commands such as the servo-control of one or more control surfaces or the sending of messages on buses connected to peripheral systems (not shown). These commands, before being taken into account, are subjected to a processing in order to determine their validity and to know if they have no impact on the integrity of the system 2.

Thus, in the test phase, said test device 12 is formed in such a way as to make it possible, in particular:

- to view in real time at least one input available on at least one flight control computer 3;
- to activate at least one output of at least one flight control computer 3; and
- to view in real time failures associated with the system 2 and/or with the computer or computers 3.

It will be noted that in the test phase, the flight control computers 3 can be in test mode independently from one another. Moreover, in the case where some of these computers 3 have remained in functional mode, the computers 3 which are in test mode comply with all of the logics of the system 2, in order not to create functioning able to lead to damage of one or more components of said system 2.

The test system 1 according to the invention is also formed in such a way as to make it possible to force the activation of parts of the failed system 2 and thus to allow it to locate a fault more easily.

Furthermore, according to the invention, once a computer 3 has been put into test mode, a return to functional mode can be carried out only by reinitializing said computer 3.

It will be noted that the purpose of said test phase is, in particular:
- both to respond to the requirements of tests during the construction of the aircraft and to improve the location of faults once the means set up for the construction are no longer available (aircraft under test or in use);
- to be able to use the flight control computers 3 of the flight control system 2 directly for testing the wiring, which makes it possible to dispense with the usual simulation tools; and
- to facilitate the searching for anomalies by no longer using a usual functional software (used in said processing means 4) of a flight control computer 3 for testing the flight control system 2, but by using a test software (used by said processing means 5) which is specific and which is dedicated to fault-finding operations.

Figure 3:
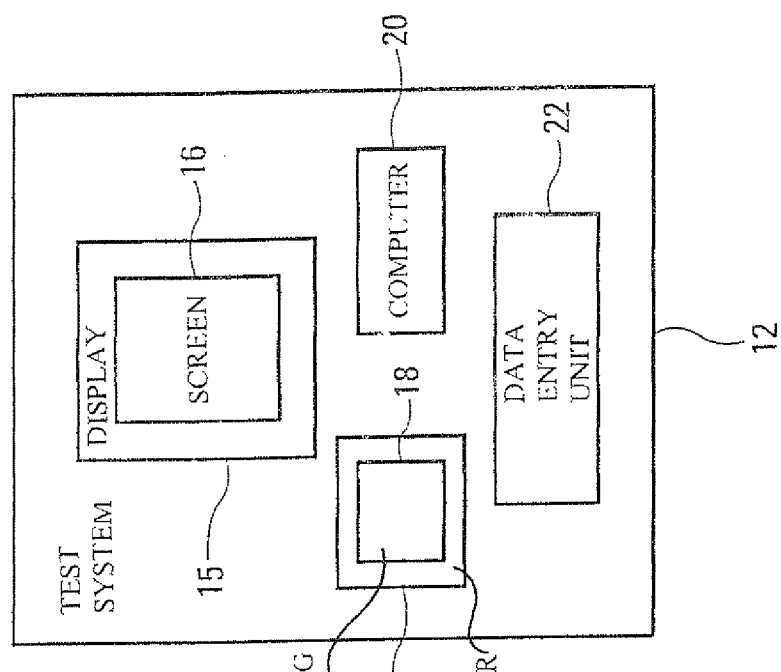
FIG. 3 is a diagrammatic illustration of a particular embodiment of a test device forming part of a test system according to the invention.

In a preferred embodiment, said test device 12 comprises, as shown in FIG. 3:
- at least one display means 15 making it possible to present, on at least one display screen 16, information received from said flight control system 2, which can thus be immediately viewed by an operator; and/or
- at least one recording means 17 making it possible to record, on at least one usual recording medium 18, for example a floppy disk, information received from said flight control system 2, which can in particular be used subsequently for carrying out tests.

In a particular embodiment, said test device 12 furthermore comprises a means which for example forms part of an integrated computing unit 20. The purpose of this means is to trace the evolution in real time of a piece of information (for example a particular flight parameter) received from said flight control system 2, and to do this in both the data reception phase and in the test phase.

Moreover, said test system 12 furthermore comprises a secure gateway 19, by the intermediary of which the test device 12 can be connected to at least one usual communication bus 14 of the aircraft, which generally interconnects at least the various flight control computers 3 of the flight control system 2.

Moreover, in order to increase safety even more, said system 2 comprises security means 21 in order to secure the activation of the test mode, for example by making necessary the connection of physical keys on the aircraft and/or the sending of a password to the associated flight control computer 3.

Due to the invention, a particularly well-performing test system 1 is therefore obtained. This test system 1 makes it possible, in particular:
- to reduce and to simplify greatly the tests carried out on a flight control system 2;
- to provide a complete display of said flight control system 2 in real time (in data reception mode);
- to observe the faults associated with the flight control system 2 in real time, and thus to be able to locate the intermittent faults easily;
- to be able to automate repetitive tasks simply;
- to be able to intervene rapidly and in a simple manner on the aircraft; and
- to save time in all of the maintenance operations associated with the flight control system 2, in comparison with usual test systems.

In a preferred embodiment, said test device 12 represents a man/machine interface tool, preferably a portable personal computer, which comprises, as shown in FIG. 3, at least one display screen 16 and at least one unit 22 (such as a keyboard for example) allowing an a operator to enter data. Thus, said test device 12 and therefore said test system 1 have very great mobility, which allows its users to intervene very easily on the aircraft, and to do so wherever that aircraft is located.

In another particular embodiment, as a variant of said preferred embodiment, said test device 12 corresponds to an automatic test station. This automatic test station is constituted by a computer, it is connected instead and in place of a portable computer and it makes it possible to send commands to the computers and to read the various outputs from the latter. The chaining of commands and the verification of the results obtained are carried out automatically by a program of said test station. Throughout the running of the test program, said test station saves a trace of the various results obtained in order to constitute proof that the tested system conforms with its definition dossier.

It will be noted that:
- when the test mode of one or more computers 3 is activated, the latter is put into a mode in which:
  - it continuously transmits the status of all of its inputs to the test device 12; and
  - it waits for a command coming from said test device;
- when a command is sent to a computer 3, the latter accepts it after verification that such a command can be taken into account and that it will not cause damage to the system 2. These commands make it possible for example to activate an output (simple command) or to activate the servo-control of a control surface. A computer 3 processes the commands one after another and saves them in memory (for example: if a first command activates an output A, as long as the computer does not receive a command to deactivate that output A, it keeps it active even if other commands relating to other outputs are sent meantime). Thus, all of the outputs can be activated at the same time; and
- the taking over of a computer 3 amounts to placing the latter in test mode. As soon as it is in this test mode, it is no longer the piloting devices which activate the inputs/outputs of the computer 3, but solely the commands coming from the test device 12, hence the concept of taking over. The taking over (change to test mode) is carried out by the sending of a special command which is processed by the computer 3 in question, when it is in functional mode, and which, when it is recognized and accepted, activates the test mode.

The invention claimed is:

1. A test system for an aircraft for testing a flight control system of the aircraft, said test system comprising:
   said flight control system which comprises at least one flight control computer which comprises:
   a first processor that implements a functional mode;
   a second processor that implements a test mode, in which the flight control computer can be subjected to commands received from the exterior;
   a switch that switches between said first and second processors; and
   an interface that transmits, in the test mode, to the exterior information available in said flight control computer and receives commands from the exterior; and a test device which comprises a connector that connects, in a detachable manner, to a communication bus of said flight control computer, and which cooperates with said second processor in a test phase, wherein:

said interface transmits, in the functional mode, to the exterior the information available in said flight control computer; and said test device operates in one of the following two operational phases:

a test phase, in which said test device cooperates with said second processor of the flight control computer which is then in the test mode so as to allow the taking over of said flight control computer, said taking over comprising sending commands to the flight control computer and having access to information generated by such taking over; and a data reception phase, in which said test device cooperates with said first processor of the flight control computer which is then in the functional mode so as to have access in real time to the information, including fault indications, which is available on said flight control computer, without affecting its behavior.

2. The test system as claimed in claim 1, further comprising:

a plurality of flight control computers, wherein each of said flight control computers comprises first and second processors, a switch, and an interface.

3. The test system as claimed in claim 1, further comprising a securing section that secures the activation of the test mode.

4. The test system as claimed in claim 1, wherein:

said flight control system comprises a plurality of flight control computers, and said test device connects, through the communication bus, to all of the flight control computers and cooperates with the flight control computers.

5. The test system as claimed in claim 4, wherein:

in the test phase, the flight control computers can be in the test mode independently from each other, and when some of said flight control computers are in the functional mode and others in the test mode, the flight control computers which are in the test mode comply with all of the logics of the flight control system so as not to create functioning that leads to damage of the components of said flight control system.

6. The test system as claimed in claim 1, wherein said test device comprises at least one recorder that records, on at least one recording medium, information received from said flight control system.

7. The test system as claimed in claim 1, wherein said test device comprises at least one display that displays, on at least one display screen, information received from said flight control system.

8. The test system as claimed in claim 1, wherein said test device accesses, in the data reception phase, at least some of the following information:

characteristics of control surfaces of the aircraft;
characteristics of piloting devices of the aircraft;
information relating to faults in systems of the aircraft;
a status of computers of the aircraft; and
a status of a hydraulic system of the aircraft.

9. The test system as claimed in claim 1, wherein said test device, in the test phase:

displays in real time at least one input available on at least one flight control computer;

activates at least one output of at least one flight control computer; and displays faults in real time.

10. The test system as claimed in claim 1, wherein said test device furthermore comprises an evolution tracing section that traces the evolution in real time of an item of information received from said flight control system.

11. The test system as claimed in claim 1, wherein it furthermore comprises a secure gateway, by the intermediary of which the test device can be linked with the communication bus, interconnecting at least flight control computers of the flight control system.

12. The test system as claimed in claim 1, wherein said test device represents a man/machine interface tool which comprises at least a display screen and at least a unit allowing an operator to enter data.

13. The test system as claimed in claim 12, wherein said test device is a portable computer.

14. The test system as claimed in claim 1, wherein said test device corresponds to an automatic test station.

15. A test system for an aircraft for testing a flight control system of the aircraft, said test system comprising:

said flight control system which comprises a plurality of flight control computers which each comprise:

a first processor that implements a functional mode;

a second processor that implements a test mode, in which the flight control computer can be subjected to commands received from the exterior;

a switch that switches between said first and second processors; and an interface that transmits, in the test mode, to the exterior information available in said flight control computer and receives commands from the exterior; and a test device which comprises a connector that connects, in a detachable manner, to said flight control computers, and which cooperates with said second processors in a test phase, wherein:

said interface transmits, in the functional mode, to the exterior the information available in said flight control computers; and said test device operates in one of the following two operational phases:

a test phase, in which said test device cooperates with said second processors of the flight control computers which are then in the test mode so as to allow the taking over of said flight control computers, said taking over comprising sending commands to the flight control computers and having access to information generated by such taking over; and a data reception phase, in which said test device cooperates with said first processors of the flight control computers which are then in the functional mode so as to have access in real time to the information, including fault indications, which is available on said flight control computers, without affecting their behavior.

16. The test system of claim 15, wherein:

in the test phase, the flight control computers can be in the test mode independently from each other, and when some of said flight control computers are in the functional mode and others in the test mode, the flight control computers which are in the test mode comply with all of the logics of the flight control system so as not to create functioning that leads to damage of the components of said flight control system.

17. A test system for an aircraft for testing a flight control system of the aircraft, said test system comprising:

said flight control system which comprises at least one flight control computer which comprises:

a first processor that implements a functional mode;

a second processor that implements a test mode, in which the flight control computer can be subjected to commands received from the exterior;

a switch that switches between said first and second processors; and an interface that transmits, in the test mode, to the exterior information available in said flight control computer and receives commands from the exterior; and an automatic test station which comprises a connector that connects, in a detachable manner, to said flight control computer, and which cooperates with said second processor in a test phase, wherein:

said interface transmits, in the functional mode, to the exterior the information available in said flight control computer;

said automatic test station operates in one of the following two operational phases:

a test phase, in which said automatic test station cooperates with said second processor of the flight control computer which is then in the test mode so as to allow the taking over of said flight control computer, said taking over comprising sending commands to the flight control computer and having access to information generated by such taking over; and a data reception phase, in which said automatic test station cooperates with said first processor of the flight control computer which is then in the functional mode so as to have access in real time to the information, including fault indications, which is available on said flight control computer, without affecting its behavior; and said automatic test station comprises an evolution tracing section that traces the evolution in real time of information received from said flight control system.

* * * * *